US008661702B2

(12) United States Patent
Ihm

(10) Patent No.: US 8,661,702 B2
(45) Date of Patent: Mar. 4, 2014

(54) KIT AND METHOD FOR ASSEMBLING A DECORATIVE OBJECT PATTERN UPON A SEPARATE ARTICLE

(76) Inventor: David C. Ihm, Traverse City, MI (US)

( * ) Notice: Subject to any disclaimer, the term of this patent is extended or adjusted under 35 U.S.C. 154(b) by 58 days.

(21) Appl. No.: 13/423,622

(22) Filed: Mar. 19, 2012

(65) Prior Publication Data

US 2012/0234482 A1 Sep. 20, 2012

Related U.S. Application Data

(60) Provisional application No. 61/454,042, filed on Mar. 18, 2011.

(51) Int. Cl.
*G01B 3/14* (2006.01)

(52) U.S. Cl.
USPC .......... 33/562; 33/564

(58) Field of Classification Search
USPC .......... 33/562–566
See application file for complete search history.

(56) References Cited

U.S. PATENT DOCUMENTS

| | | | | | |
|---|---|---|---|---|---|
| 2,697,884 | A | * | 12/1954 | Dechert | 434/410 |
| 2,950,537 | A | * | 8/1960 | Fixen | 33/565 |
| 3,077,797 | A | * | 2/1963 | Payne | 33/565 |
| 3,138,874 | A | * | 6/1964 | Cooper | 33/1 SP |
| 3,158,940 | A | * | 12/1964 | Corpening | 33/565 |
| 3,813,787 | A | * | 6/1974 | Mercorelli | 33/565 |
| 3,977,581 | A | | 8/1976 | Franzson | |
| 4,125,658 | A | * | 11/1978 | Miles | 33/563 |
| 4,204,610 | A | | 5/1980 | Schlaepfer | |
| 4,309,825 | A | * | 1/1982 | Geddes | 33/564 |
| 4,563,154 | A | * | 1/1986 | Vandervort et al. | 33/565 |
| 4,610,096 | A | * | 9/1986 | Sahler et al. | 33/565 |
| 4,852,483 | A | * | 8/1989 | Bussard | 33/564 |
| 4,936,116 | A | | 6/1990 | Poll | |
| 5,000,688 | A | * | 3/1991 | Clamp | 33/564 |
| 5,073,223 | A | | 12/1991 | Kurihara | |
| 5,100,324 | A | * | 3/1992 | Slayton | 33/564 |
| 5,167,743 | A | | 12/1992 | Chalfin | |
| 5,258,210 | A | | 11/1993 | Chalfin | |
| 5,396,713 | A | * | 3/1995 | Valdez | 33/565 |
| 5,533,900 | A | * | 7/1996 | Volk | 434/87 |
| 5,949,050 | A | * | 9/1999 | Fosbenner et al. | 235/449 |
| 6,615,845 | B2 | | 9/2003 | Abraskin et al. | |
| 6,829,990 | B2 | * | 12/2004 | Cochran et al. | 33/565 |
| 7,156,017 | B1 | * | 1/2007 | Ingraselino | 33/563 |
| 7,691,221 | B2 | | 4/2010 | Swarovski | |
| 2003/0116001 | A1 | | 6/2003 | Potter | |
| 2003/0131862 | A1 | | 7/2003 | Abraskin et al. | |
| 2005/0076998 | A1 | | 4/2005 | Buffum et al. | |
| 2005/0229421 | A1 | * | 10/2005 | Deas et al. | 33/563 |
| 2009/0178761 | A1 | | 7/2009 | Chen | |
| 2011/0073519 | A1 | | 3/2011 | Davis, II et al. | |

* cited by examiner

*Primary Examiner* — Yaritza Guadalupe-McCall
(74) *Attorney, Agent, or Firm* — Douglas S. Bishop

(57) ABSTRACT

A kit and method for assembling a decorative object pattern upon a fabric article including a flat, smooth surface board, a desired number of individual stencil units, slidably situated upon the board, and held movably in place by magnetic force. The stencil units are arranged upon the board surface to create a desired stencil design. Rhinestones or other decorative objects are situated within the stencil pattern with their adhesive side down. An adhesive backed cover sheet is provided to hold the decorative object pattern in place. The cover sheet is adapted to being placed on the fabric surface, and the held objects adhered thereto.

11 Claims, 14 Drawing Sheets

KIT AND METHOD FOR ASSEMBLING A DECORATIVE OBJECT PATTERN UPON A SEPARATE ARTICLE

CROSS-REFERENCE TO RELATED APPLICATIONS

The present application claims the priority of U.S. Provisional Patent Application Ser. No. 61/454,042, filed Mar. 18, 2011.

FIELD OF THE INVENTION

The current invention relates to arrangement of decorative objects, including, but not limited to, rhinestones, by utilization of a stencil or template system. The objects are arranged for application to clothing or objects, such as scrapbooks, home decorations and the like, without the use of computers, software or other complex machinery.

BACKGROUND OF THE INVENTION

The prior art includes examples of computer controlled machines, which pickup and place rhinestones onto a transfer film in a computer designed pattern in preparation for application to garments or other articles. While these computer controlled devices have the advantage of precision accuracy, speed, and limit individual manual labor per production unit, they are primarily directed to large quantity production, and are financially prohibitive for the hobbyist, or individual custom craft artist.

Another method, disclosed by the prior art, is by computer designed templates or stencils created by computer numerical control (CNC) machines. These machines create stencils for the pattern of holes, or cavities, of a specific depth so that, when decorative objects or rhinestones are swept across the surface, the objects are trapped within the holes arranging in precisely in the preferred template/stencil pattern. In this method, the rhinestones/decorative objects are then lifted by transfer film for application to clothing or other articles.

The prior art also includes a method of self-made templates in which the user manufactures a single template for each design. These self-made single design templates offer precision accuracy and, once the template is completed, provide a speed feature for multiple applications from the same template. Self-made templates are nor cost-effective for the smaller operator, however, and equipment and software to manufacture them are often too expensive for many individuals and businesses. A skilled operator is needed to operate software and equipment and the time and effort involved to do small quantities is extensive and cost-prohibitive. Purchasing previously manufactured templates, for a particular design, also have similar disadvantages, primarily costs and the inability to revise the design to individual preferences.

Rhinestones or other similar decorative objects may also be placed directly on garments or other articles by hand placement, which may be accomplished by several method: A hear wand tool may be utilized. Such a tool picks up individual objects, with pre-applied adhesive, hears them to liquify the adhesive, and then applies each object individually to a garment or other article. A transfer film method may be utilized, involving placing the individual rhinestones, again, one by one, onto a clear transfer film, usually following a pre-printed pattern beneath the film, one at a time until the pattern is completed and ready to heat apply to a garment or object. Additionally, rhinestones or other decorative objects, with heat activated adhesive at their base, may be arranged on the actual garment or object in a desired pattern. Once in place, they may be heat applied, permanently, to the garment or object.

Another method is disclosed by U.S. Pat. No. 6,615,845, to Abraskin et al, wherein, for applying a rhinestone facial display and display at other locations, a transfer rod transports the rhinestone, held by static electricity charge, to an adhesive previously deposited at the display site and which rod is then backed off resulting in a rhinestone remaining because the adhesive attachment is greater than the hold of the static electric charge.

Other cools exist (one of which is commonly known as a “bedazzler”) which individually attach Rhinestones to garments in a two-part configuration with a metal base which crimps around the rhinestone from the opposite side of the garment, providing an affixation method similar to that employed by a rivet. Again, the design arrangement may lack precision, and is slow, tedious and repetitive, particularly when one design is intended to be placed on multiple articles.

Other applications involve using a reusable grid board with holes in a graph-like arrangement, allowing the user to place individual rhinestones in selected holes to arrange a particular pattern, then utilizing a transfer film to attach and lift them out of the grid for application to garments or other objects. While simple, the size of the design is limited to the particular board and the particular hole pattern of the board limits the design capabilities and options available to the user. Likewise, the rhinestone or decorative object size is limited to the size of the particular holes in the board, which is a disadvantage, particularly if, in the individual design, the user desires to intersperse different sized decorative objects. A take off on the same grid arrangement allows the application of plungers to fill unused holes, leaving only holes desired for the particular design, and then to sweep the rhinestones or decorative objects across the surface and remaining grid holes, so that rhinestones or other decorative objects, as applicable, are trapped within the unplugged holes in the template pattern. Again, a transfer film is used for application to garments or other articles. The advantages and disadvantages are similar to the above recited grid board application.

One additional method of applying rhinestones involves the use of a material called “sticky flock” which is an upper cloth material, with an adhesive backing, which may be cut into different custom stencil sizes, and arranged in a desired overall design. “Sticky flock” applications to date are problematic because the adhesive backing in general does nor allow slidable arrangement for modification of designs once placed, it is difficult to reuse because of potential stretching and/or shrinkage of material, and loss of the adhesive background.

Thus, a need exists, which the prior art has not addressed, for a kit and a method for applying decorative objects to other articles which allows for a variety of reusable stencil or template units, each containing various design elements, which may be interchangeably placed together to form various designs and may be placed, and resistibly, slidably moved by the maker, across a flat baseboard to form the designs, and which, when finally placed, will hold their position, unless some significant outside force is applied to slidably move them from their desired position.

SUMMARY OF THE INVENTION

The instant invention is directed to provision of a kit and method for assembling a pattern of adhered decorative objects on a fabric or clothing surface, or other article.

More specifically, the invention is directed to provision of such a kit and method by which an individual, without the aid of complex or expensive machinery, can form decorative designs of precision alignment for the arrangement of rhinestones, or other decorative objects, in such a pattern, for adhesion to a fabric or other type of article surface. A further object of the invention is to allow the same pattern to be used for multiple applications of the same design without detracting from the precision arrangement of the design as ultimately determined by the user.

Further, the invention is directed to provision of a forming board, with a smooth surface, and an arrangement of stencil or template units, which may be slidably arranged thereon to the precise precision design desired by the user. The stencils/templates may be slidably mounted on the board and adjusted thereon while being held slidably in place by sufficient magnetic force.

According to an important feature of the invention kit, a flat surface mounting board is provided. The board is of sufficient size to provide for an arrangement of the desired design on its surface. Although not required for the basic novel improvement of the invention, the mounting board may provide longitudinal and latitudinal lines, in the nature of overlaid graph, imprinted on its surface, to assist the user in aligning the stencil pieces as desired.

The mounting board, generally, contains the magnetic element. A layer of magnetic materials beneath the vinyl and above and supported by a base of rigid material to maintain structure is provided.

Next, a number of individual stencil units, of uniform thickness, each having a designated number and position of designated apertures or holes is provided. The apertures or holes are configured to accept the flat base of a decorative object therein. The stencils may be placed upon the mounting board. They are constructed of magnetically attractable material, which may be rigid, metal, or of other flexible magnetic sheet, retainable to flat orientation, material. The upper and lower sides of each of the stencil units are smooth, parallel and essentially identical. Accordingly, any individual stencil may be reversed, for any particular design, to provide what would essentially be a mirror image. A supply of decorative objects, which may be rhinestones, rhinestuds, or any other decorative object comprised of material which may include rock crystal, metal, ceramic, glass or acrylic, having a flat base, and a raised upper surface are provided. Enough decorative objects are provided to fill each of the cavities of the stencils which are arranged in the desired design. The decorative objects, in the preferred embodiment, have a pre-applied hear activated adhesive on their under or flat side, which is conformed to fit within each cavity, with the adhesive flat side down. The stencils are conformed so that the tops of the decorative objects are at least equal to or higher than the upper flat surface of the stencils. A cover sheet comprised of mylar, or other appropriate flexible sheet material, having an adhesive backed side is then laid over the entire design, with downward pressure applied, so that the adhesive back of the sheet returnably contacts each of the rhinestones or other decorative objects. The cover sheet is then positioned appropriately on the fabric or other clothing article, or other type of article on which the design is desired to be imprinted, so that the underside of each of the decorative objects contacts the article, and a hear source, which may include an iron, hear press, or the like, is applied, causing the heat activated adhesive on each of the decorative objects or rhinestones to adhere to the fabric garment or other article.

A key feature of the invention, irrespective of the use to which the design templates or stencils may be put, is the basic, but novel, combination of a mounting board, having a rigid, form-holding base, supporting a magnetic layer, overlaid with a smooth, flat upper surface, of a low friction material such as vinyl or a like substitute.

Any desired number of individual flat stencil units are placed upon the smooth, flat surface, each stencil unit containing a desired design element. The stencils are of magnetically attractable material.

While the stencils are held against the board by magnetic force, they are slidable on the board so that they may be moved and combined into a desired design. Once in place, the magnetic force of the board holds them in place absent intentional exerted force parallel to the upper surface.

Another key, and novel, embodiment of the invention is the provision of stencil sheets, each containing multiple stencils, having different design elements and each sheet being of magnetically attractable material. The stencils of each sheet are cut out, or stamped through the sheet, leaving only one or more severable tabs holding each cur out stencil parallel and in place. Upon initial selection of a stencil, the designer simply applies force to the stencil and each tab breaks, freeing the stencil from the sheet for mounting on the board.

The above and additional features of the invention may be considered and will become apparent in conjunction with the drawings in particular and the detailed description which follows.

DETAILED DESCRIPTION OF THE PREFERRED EMBODIMENT

Figures 1, 1A, 1B, 1C:
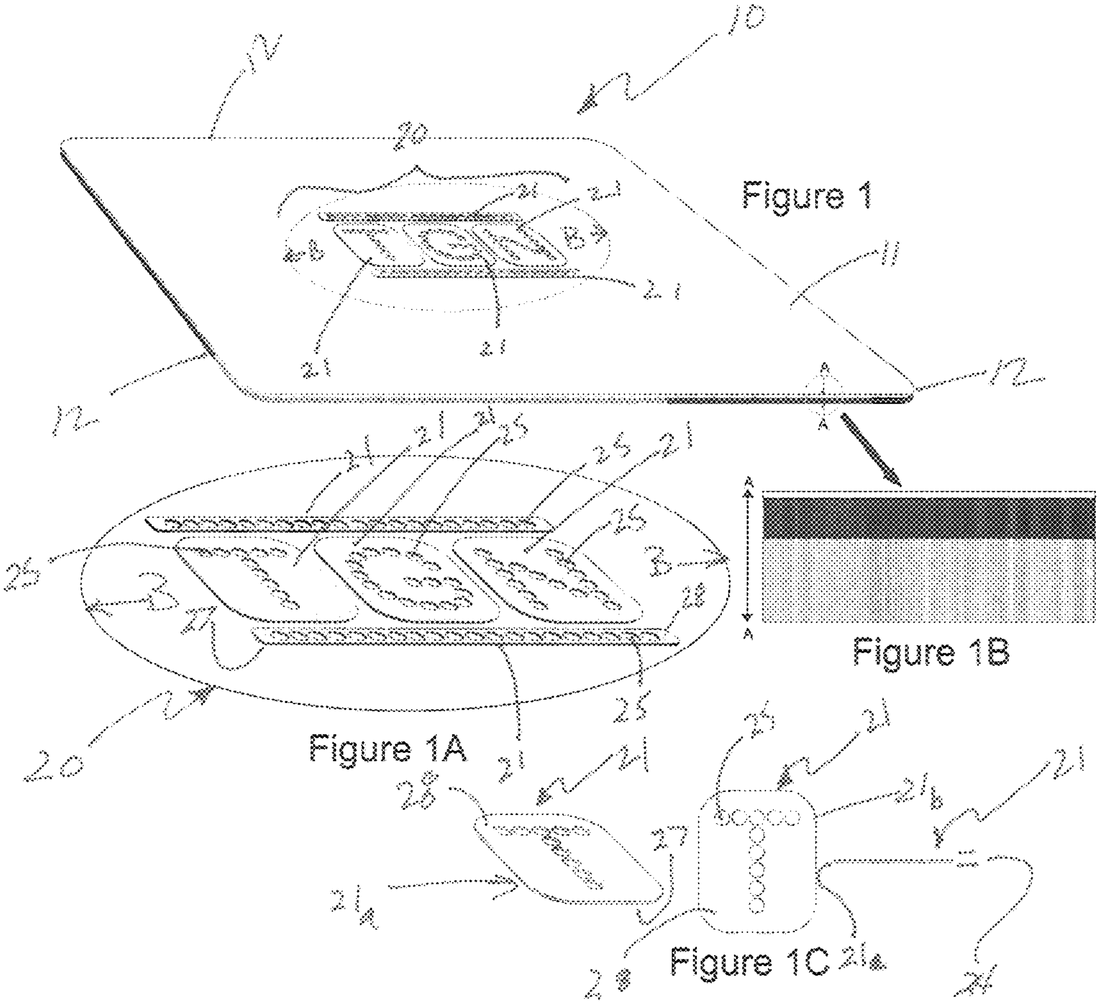
FIG. 1 is a perspective view of a mounting board member with an arrangement of the stencil/templates of the invention arranged on the surface thereof in a decorative design. Each of the stencil units contains design elements which are combined together in a desired design as shown.
FIG. 1A is a perspective view of an oval portion of the upper surface of the mounting board member showing the stencils aligned thereon to form a decorative design in close-up detail.
FIG. 1B is a cross-sectional view of a portion of the perimeter of the mounting board shown in FIG. 1 on line AA.
FIG. 1C shows a perspective view, a top view and a side view, of an individual stencil.b

The invention, Kit and Method for Assembling a Decorative Object Pattern on a Separate Article, broadly considered, includes a mounting board member 10 having a substantially flat upper surface 11 and a defined perimeter 12. Flat upper surface 11 is preferably of low friction material, such as smooth vinyl, and may be comprised of any material having a smooth, low friction surface, and through which magnetic attraction of metallic objects may be maintained. Board member 10, in the preferred embodiment, has, in addition to flat upper surface 11, a rigid lower layer support base 13 and a middle layer of magnetic material 14. Upper surface layer 11, support layer 13 and middle layer 14 are substantially in parallel and all share the same perimeter 12. Ideally, lower layer 12 is rigid for support, but it does not depart from the spirit of the invention for the entire mounting board member 10 to be flexible so long as it will conform to and lie parallel upon a substantially horizontal surface. The composition of the preferred embodiment of board member 10 is shown in FIG. 1B which is a cross-sectional view of perimeter 12 of board 10 along line AA.

Figure 4:
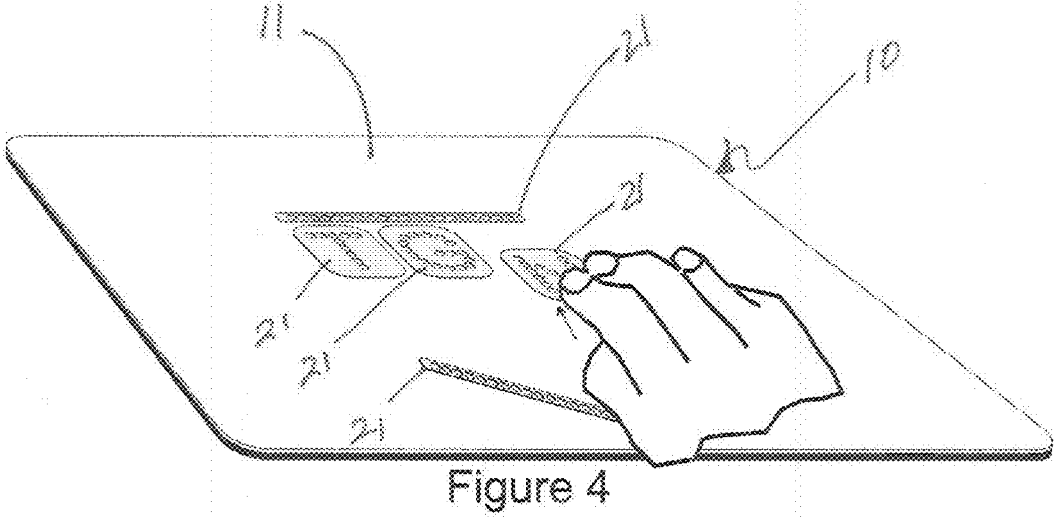
FIG. 4 shows, in perspective, a mounting board, with its flat upper surface, an assembly of individual templates, each having perforations establishing a total design element, and hand of a user, moving the stencils, which are held movably, slidably in place, to form a desired design.
Figure 5:
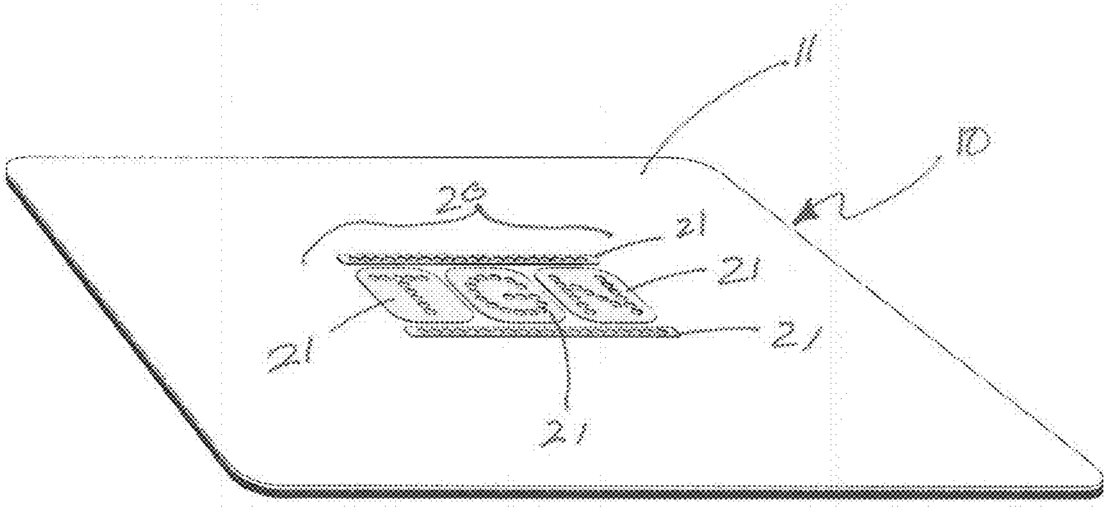
FIG. 5 is a perspective view of a mounting board with a group of assembled design element stencil/templates, in a formed artistic design. The stencils are held in place in the design by magnetic force.
Figure 6:
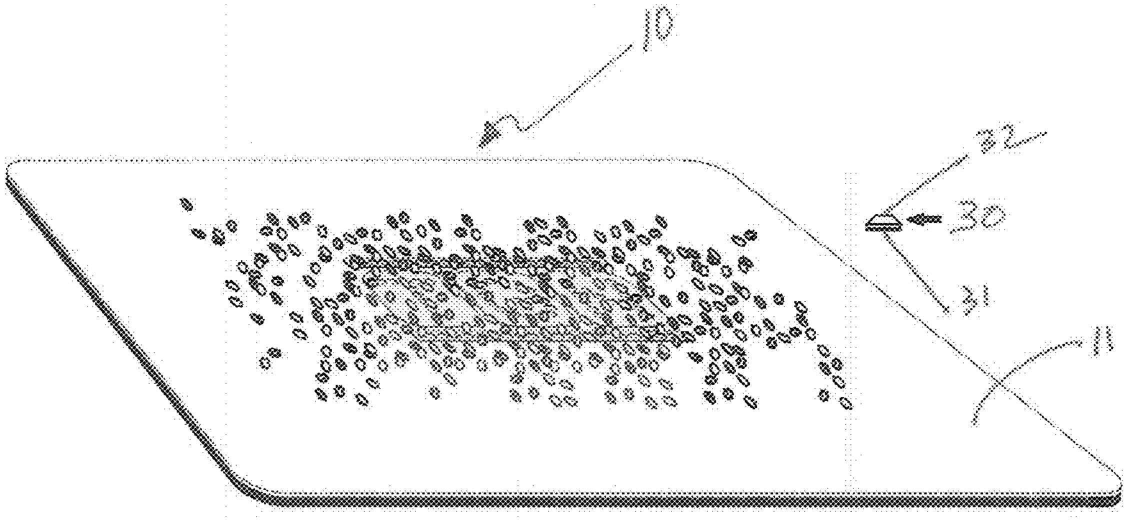
FIG. 6 is a perspective of said mounting board and artistic design of FIG. 5, with a supply of decorative objects scattered across the upper surface and stencils. A side view of an individual decorative object is shown.
Figure 9:
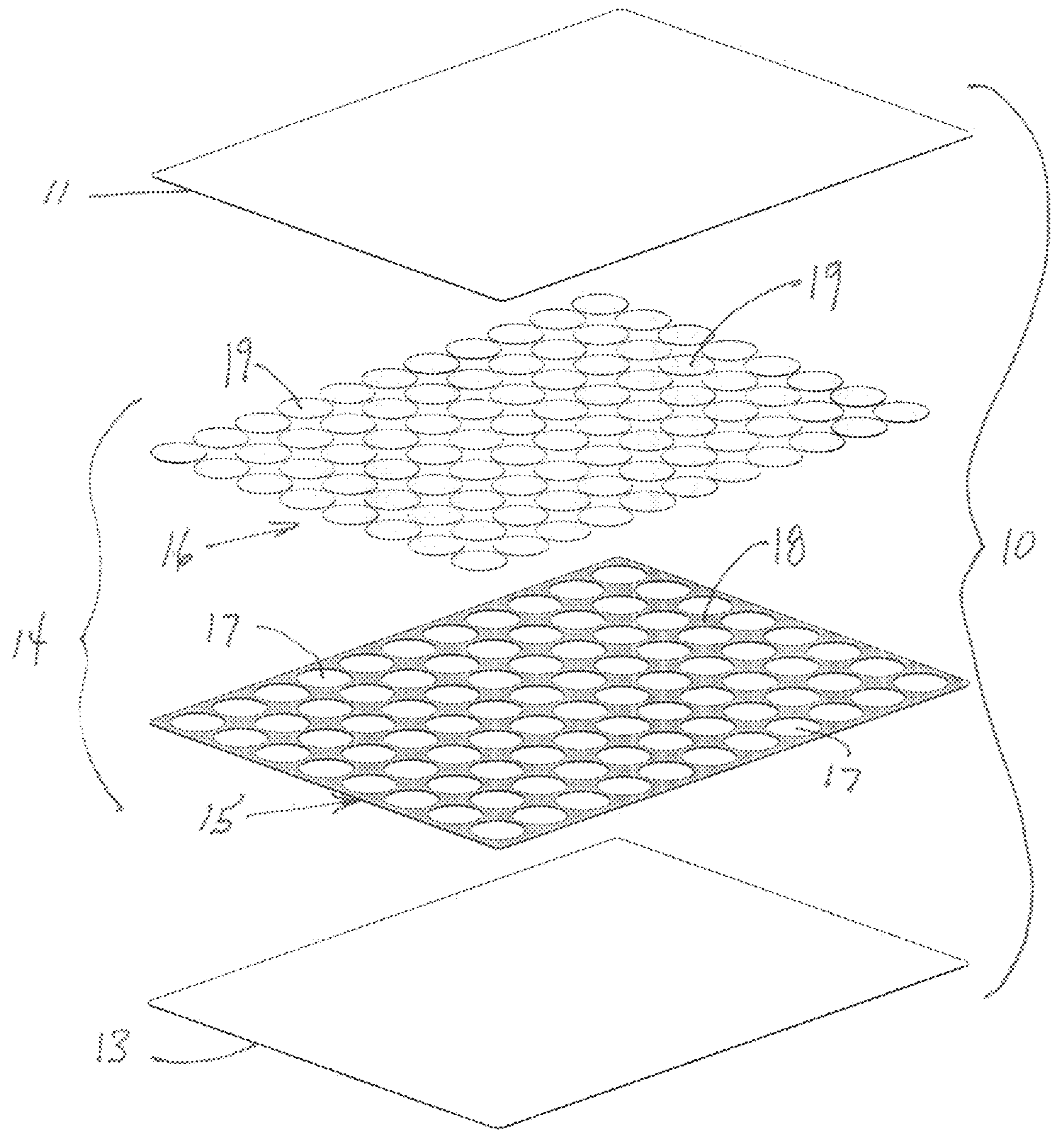
FIG. 9 is an exploded view of another embodiment of the mounting board, showing a base, a retaining matrix, a set of individual magnets conformed to the retaining matrix, and an upper surface.
Figure 10:
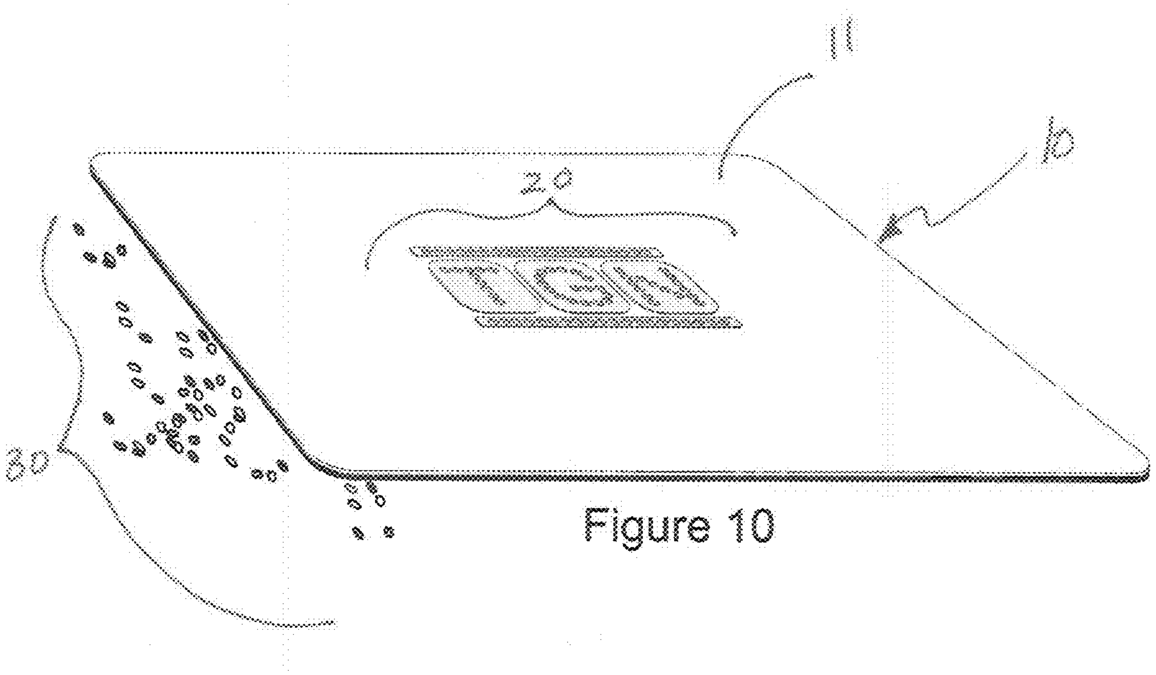
FIG. 10 is a perspective view of the mounting board, with a centered chosen decorative design, the stencils being held in place by a magnetic force, and each aperture of each stencil of the design having each aperture filled with a decorative object and further showing the decorative objects in excess of the total number of stencil apertures having been brushed from the board's surface.
Figure 11:
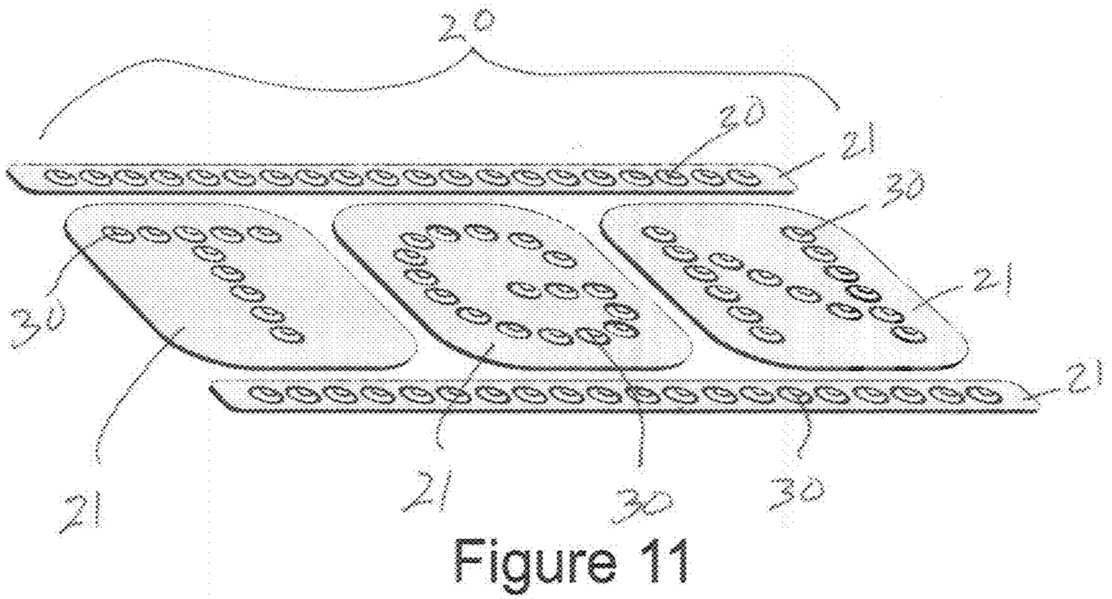
FIG. 11 is a close up perspective view of a decorative design comprised of combined stencil/template units, each containing separate design elements, held together by magnetic force, with each aperture of each design unit being filled with a conforming decorative object.

The primary feature of board 10 within the overall invention remains the upper surface 11 being smooth enough to slide flat objects thereon as shown in FIG. 4, and that the board 10 generate sufficient magnetic attraction to hold any desired number of stencils (alternatively described herein as template) slidably in place on surface 11. Reference is herein made to FIG. 9, which shows an exploded view of an alternative construction of board 10, wherein the base layer 13 supports a matrix sheet 15, said sheet 15 containing and defining a number of adjoining apertures 17 across its entire surface 18 and a like number of neodymium magnets 19 corresponding to and conformed to fit within each aperture 17. The matrix sheet 15 and magnet 19 combination comprise middle layer 14 and are covered by smooch surface layer 11.

The kit includes a selection of multiple stencil units 20. Each individual stencil unit 21 of the multiple units 20 provided is substantially flat as shown in FIG. 1C with a lower surface 22 and a substantially parallel upper surface 23. FIG. 1C shows a perspective view 21*a* of an individual stencil unit 21; a top view 21; and a perimeter view 21*c*. The distance between parallel surfaces 22 and 21 defines a uniform thickness 24 for all individual stencil units 21 provided.

In the preferred embodiment, the multiple stencil units 20 have a thickness 24 of substantially 0.025 inches and the stencil units 20 are comprised of magnetically attractive stainless steel. However, other metals or materials containing magnetically attractable properties which are substantially non-deformable and, if comprised of flexible material, are returnable to a flat planar disposition, and are of substantially uniform thickness 24 will suffice.

Each individual unit 21 defines on its surface one or more generally circular apertures 25. In the primary embodiment, these apertures are of equal depth and extend completely through each unit 21. The parallel lower and upper surfaces 22, 23 and the complete extension of the apertures in this embodiment provides a reversible feature for each stencil unit 21, as shown in FIG. 2*a*.

Figure 2:
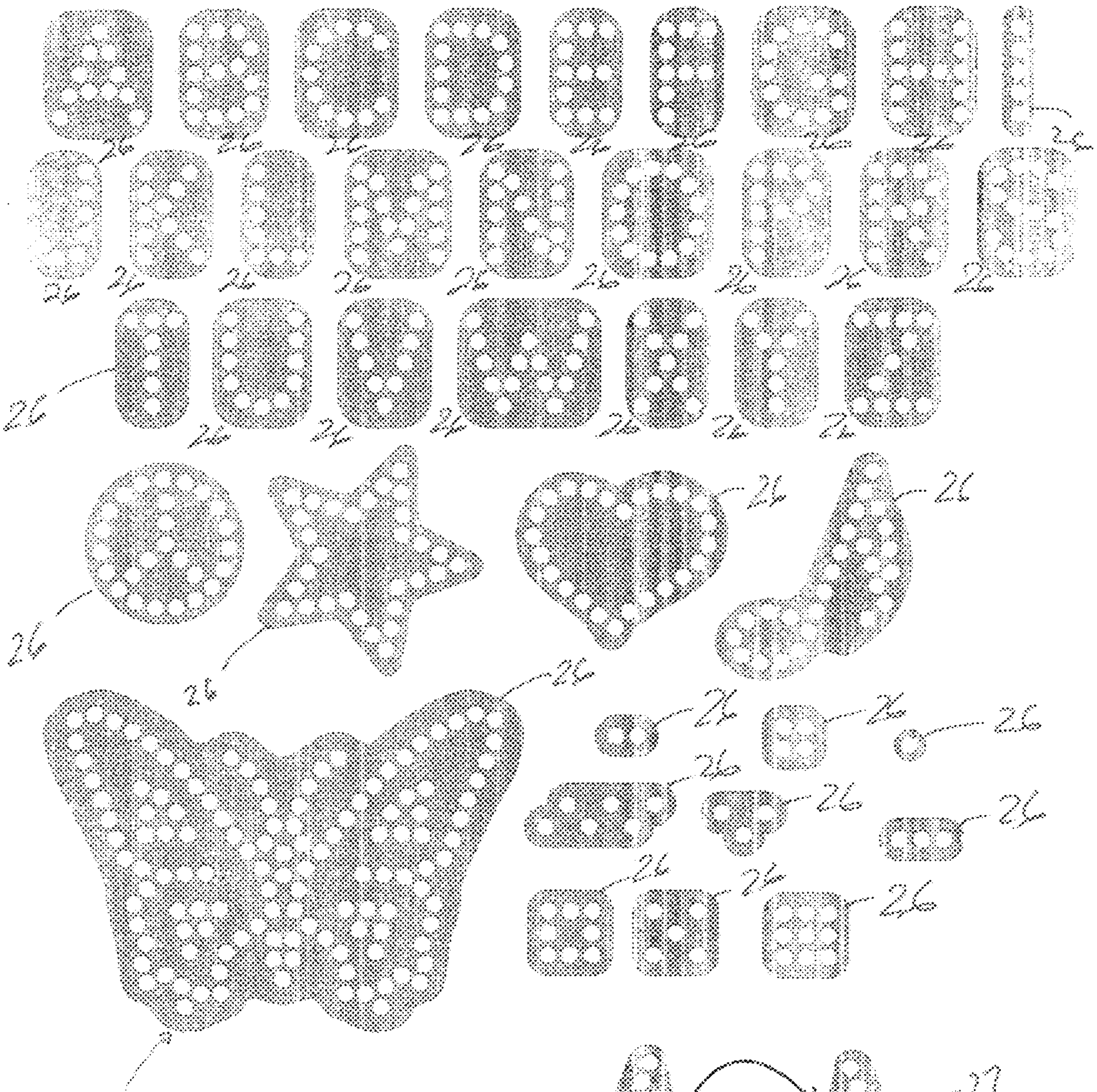
FIG. 2 is a top view of a variety of individual stencil/template units, each having different design elements thereon, with the design elements shown as defined apertures. Further, the perimeter of each individual stencil unit demonstrates a defined perimeter edge of the stencil unit which surrounds all of the apertures comprising the design element.
Figure 2A:
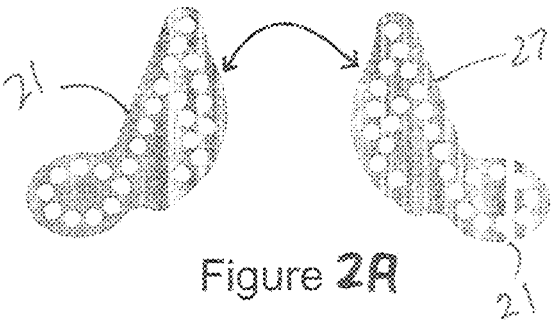
FIG. 2A shows a top view of an individual stencil unit and a corresponding bottom view of the same stencil unit demonstrating how any particular design element may be reversed by reversing the upper and lower surfaces of the stencil unit.

The one or more cavities 25 in each stencil unit 21 comprise an individual design element 26, as shown in FIG. 2. Each stencil unit 21 has a perimeter edge 27 which is exterior of every aperture 25 sufficient to provide a board 28 on the surface 23 surrounding each individual deign element 26 on each stencil unit 21.

Each stencil unit 21 containing a design element 26 may be placed with its lower surface 22 proximate the smooth upper surface 11 of board member 10. The individual units are slidably held against the surface 21 and manually moved, as shown in FIG. 4 unit the individual design element 26 of each stencil unit 21 for a total desired design as shown in FIGS. 10, 11, 12 and 13.

In the preferred embodiment, the stencil units 21 are held slidably in place by magnetic force of board 10, but the source of the magnetic force is not in limitation of the invention, which could equally function with magnetized stencil units 21 and a magnetically attractable board member 10, with a smooth upper surface 11. Although not shown, the magnetic force of board 10 could be supplied through means of an attached electromagnet.

Figure 8:
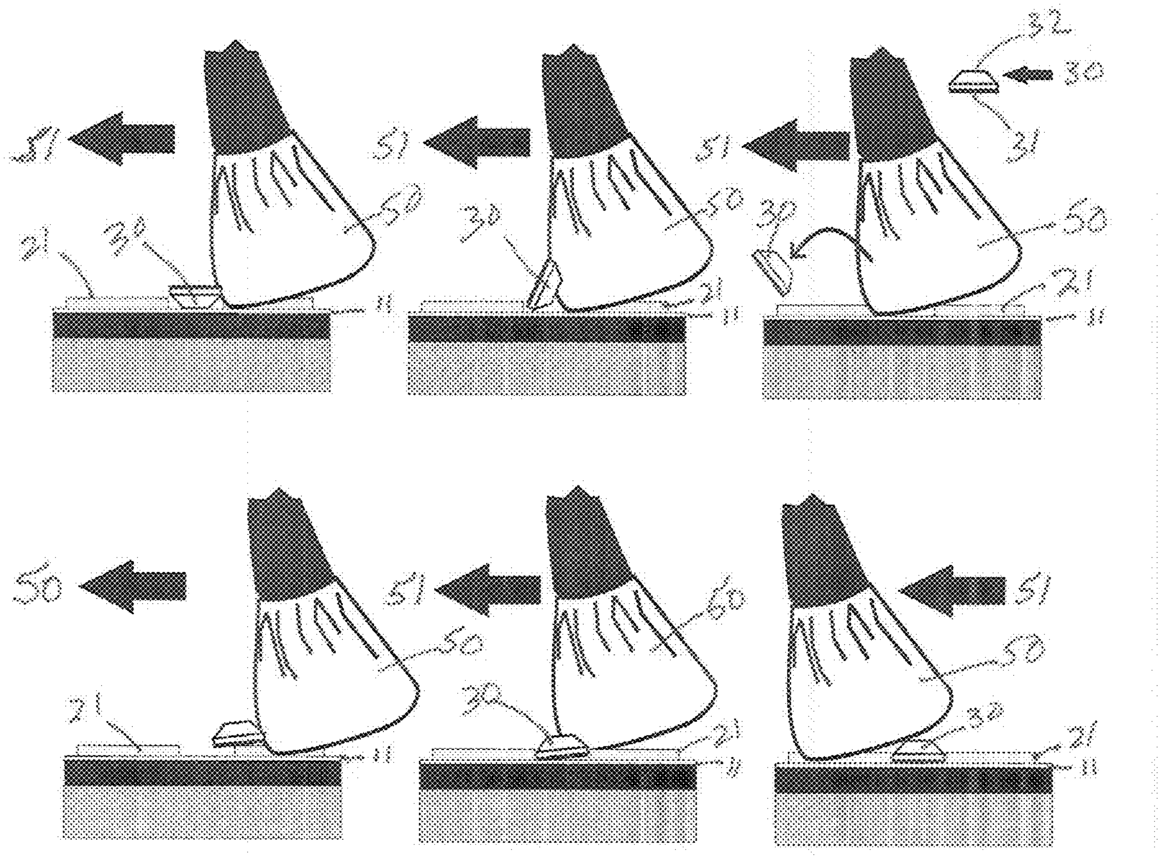
FIG. 8 is side view showing a cross-sectional view of the mounting board, aperture, and an individual decorative object, as well as a brush, with force of the brush being shown from right to left, demonstrating how a properly aligned decorative object, when brushed across, is seated within a corresponding aperture, and how an improperly aligned decorative object is not.

In the primary embodiment, a supply of decorative objects 30 is provided. The decorative object 30 may be rhinestones, rhinestuds, or the like, and the objects may be made of rock crystal, metal, ceramic, glass, acrylic or like material. Each decorative object 30 has a flat lower base surface 31 to which is adhered a heat activated adhesive. Each lower base surface 31 is shaped to fit conformably within an aperture 25 comprising a part of design element 26. Each decorative object 30 has an upper surface 32 and the distance between the upper surface 32 and base surface 31 is at least the depth of each aperture 25, which, in the preferred embodiment, is the distance between upper surface 23 and lower surface 22 of each individual stencil unit 21, as shown in FIG. 8 and further shown in FIGS. 11 and 12.

Figure 3:
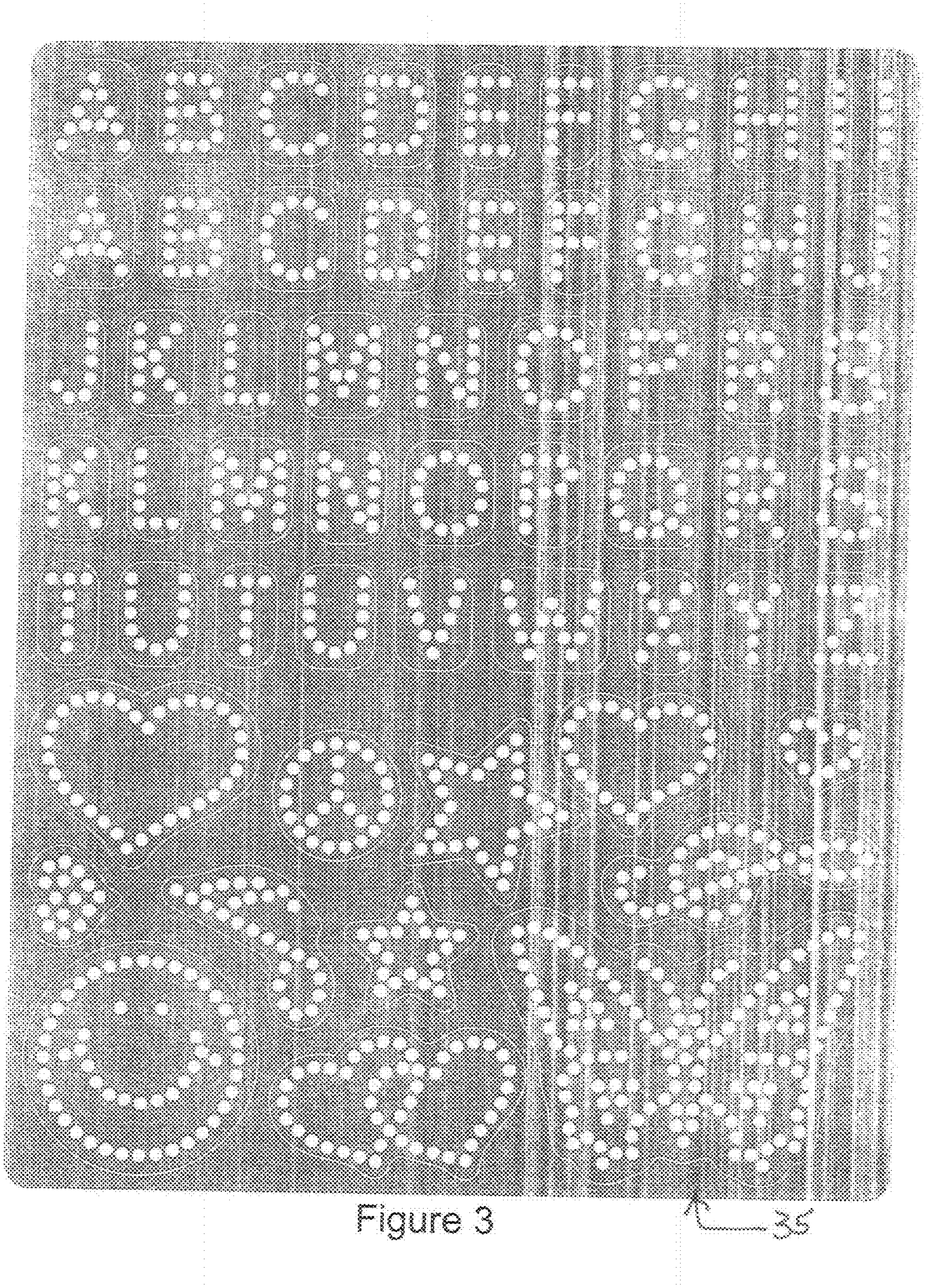
FIG. 3 is top view of a sheet, containing multiple individual stencil/template units, each separated or cut our from the sheet by either laser technology or acid photo etching, but retained in place, parallel to the sheet material.
Figure 3A:
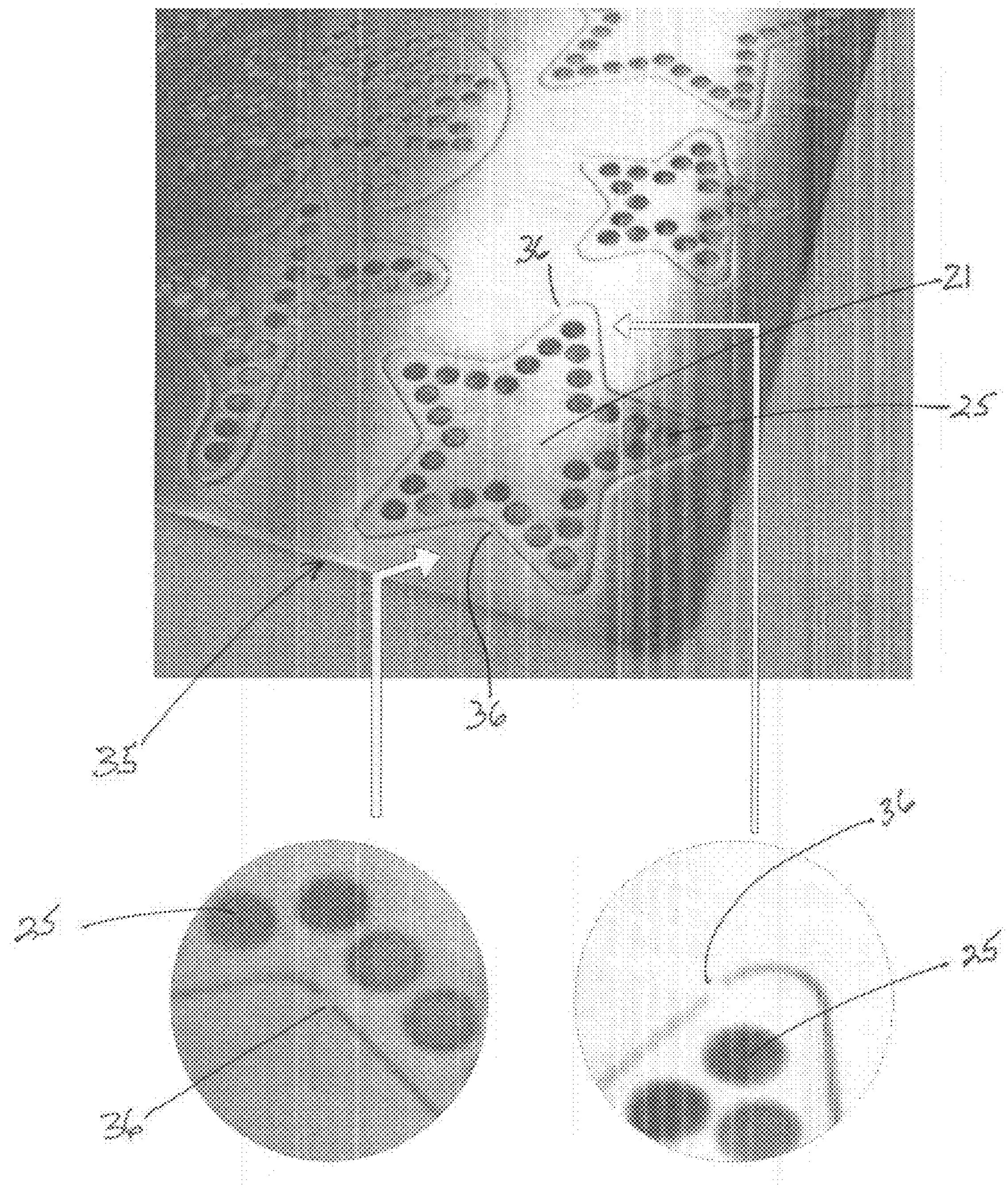
FIG. 3A is a top view of a corner of a stencil sheet, highlighting an individual stencil/template, showing the stamped or cut lines, and highlighting the severable tabs, which hold the stencil/template and place within the sheet until it is removed by the designer.

It is a feature of the invention chat one or more sheets 35 with multiple and different undivided stencil units 21 cut or stamped thereon, as shown in FIGS. 3 and 3*a*, are provided. Each individual stencil unit is cut out, stamped, or otherwise partially separate from said sheet 35, except for one or more tabs 36 of unsevered sheet 35 material as more particularly shown in FIG. 3*a*. Thus, the individual stencil units 21 remain minimally attached to, and held in parallel with, sheet 35, until severed by a user by applying upward or downward pressure to the stencil unit 21. The initial inclusion of all stencil units 21 within sheet 35 provides for ease in storage, transport and selection of individual stencil units 21 and their respective contained design elements 26 for incorporation for a total desired design as shown in FIGS. 10, 11, 12 and 13.

Figure 12:
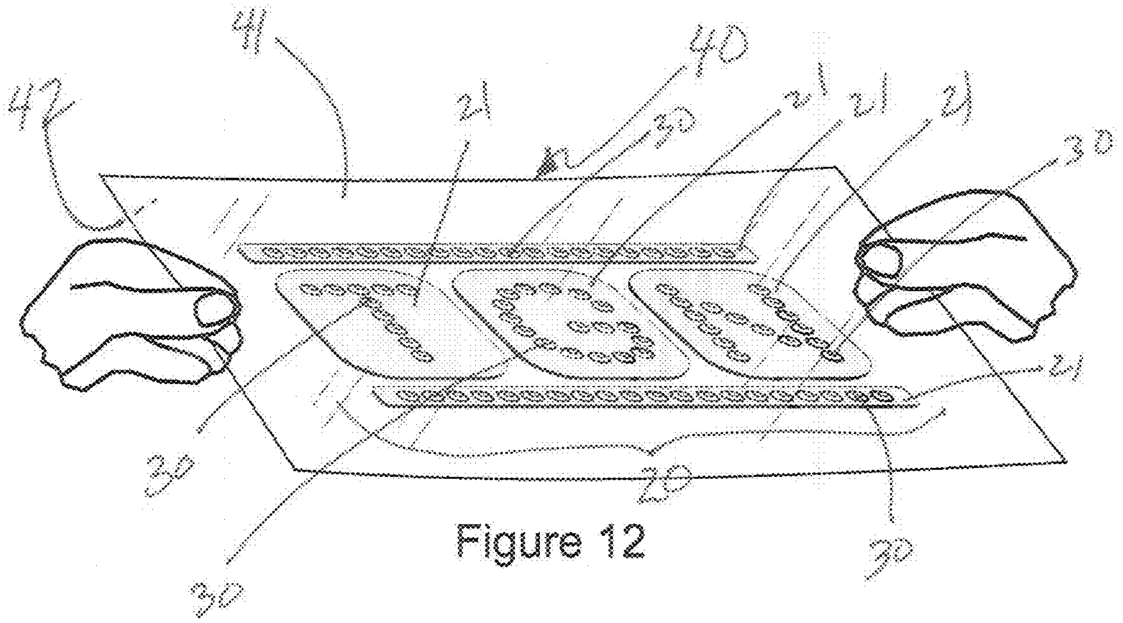
FIG. 12 is a perspective view of a sheet, with an adhesive undersurface, being laid over an assembled stencil/template pattern, with decorative objects extending from each of the apertures of the design.
Figure 13:
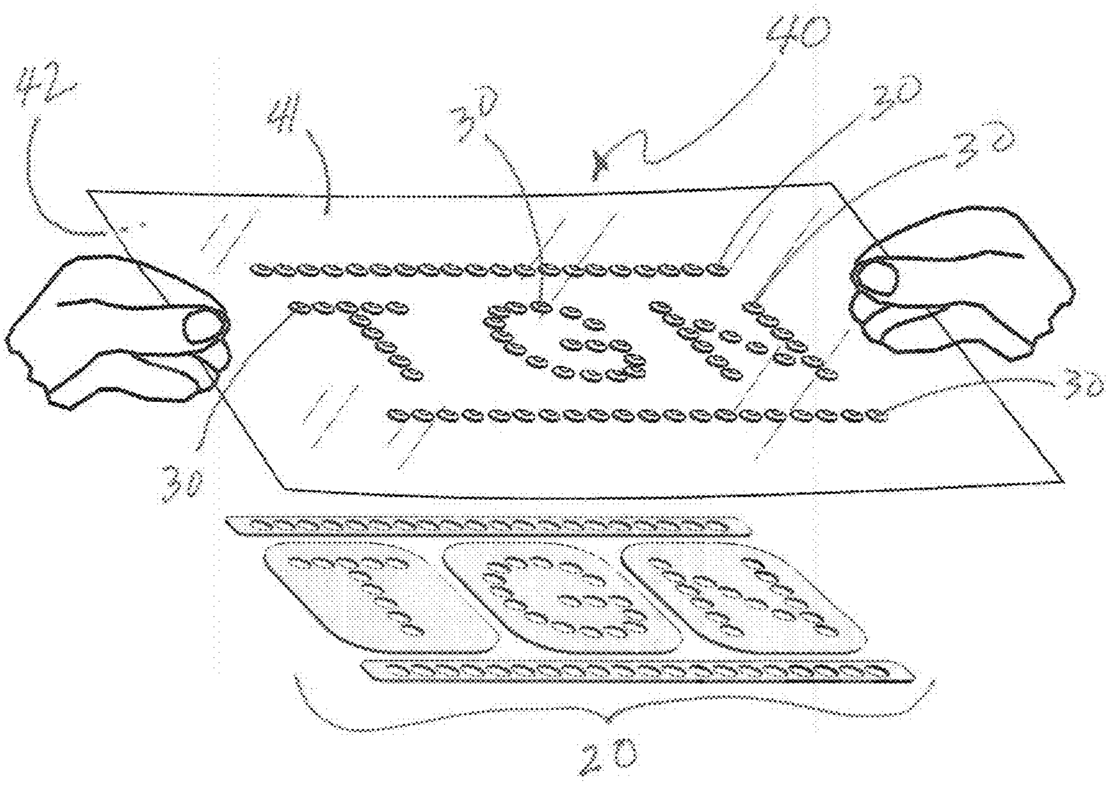
FIG. 13 shows a sheet, with decorative objects adhered to its undersigned, being lifted from the combined stencil/template units of the desired design, which remain held in place, in preparation for being applied to a separate article.

The present invention further includes a retaining cover sheet 40 having an upper surface 41 and an adhesive backed lower surface 42 as shown in FIGS. 12 and 13. Retaining cover sheet 40 is of sufficient size to cover the total desired design as shown in FIGS. 12 and 13. The sheet cover 40 is of mylar or like material and is preferably transparent, with a surface strength and sheet rigidity sufficient to maintain the placement of the decorative objects 30 in the desired design, when adhered to the adhesive backed lower surface.

It is the intent of the invention that the retaining cover sheet 40 be placeable over the entire desired design form by the combination of stencil units 21 and that the decorative objects 30 confirming to the totality of design elements of the cavities 25 be adhered to and remain with sheet 40 when it is manually lifted upwardly and away from the mounting board 10 and magnetically adhered stencil units 21. Sheet 40 is adapted to being placed over a separate article to which the decorative objects 30 are to be permanently adhered, which separate article may be clothing or other fabric or comprised of other materials such as paper, wood and/or metal.

The present invention includes a novel method for assembling a decorative object 30 pattern ("pattern" used herein interchangeably with "design") on a separate clothing or other fabric article, although the same method may be utilized to apply such a decorative pattern on paper, wood, metal, ceramic, glass or other article surfaces. The novel method includes the following steps:

A. First, the kit of the present invention including the board 10, plurality of stencils 20, decorative objects 30 and cover sheet 40, as described in more detail previously, is provided;

B. Next, the plurality of stencil units 20 is placed upon mounting board 10, and positioned so that the totality of cavities 25 in the individual stencil units 21 form a desired design.

C. Next, the lower surfaces 22 of the stencil units 21 are held in position against the flat upper surface 11 of board 10 in the desired design position by magnetic force.

Figure 7:
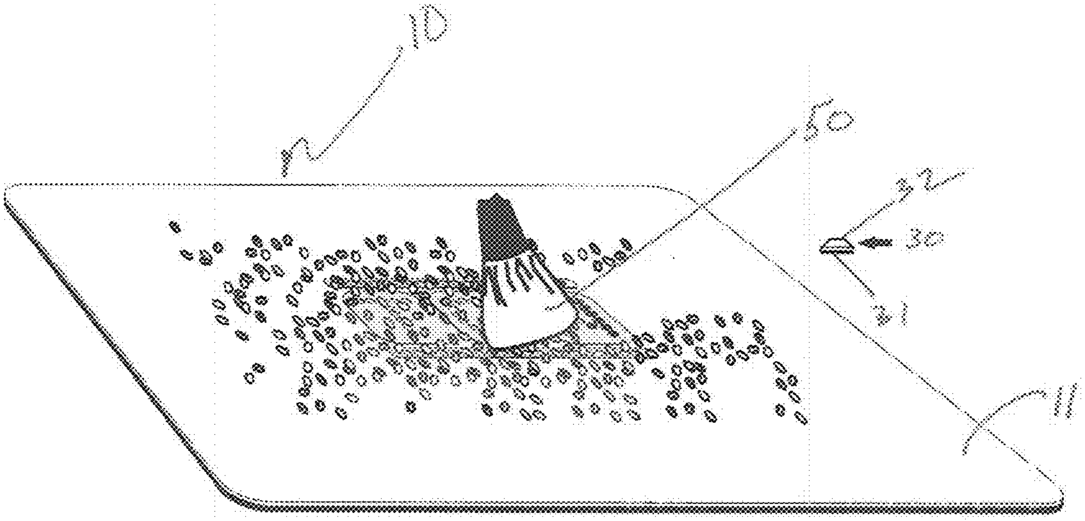
FIG. 7 is another perspective view of the mounting board and assembled decorative design of FIG. 5, with decorative objects scattered thereupon, and the head of a brush being utilized to sweep the decorative objects across the face of the stencil/template units in order to lodge a corresponding decorative object in each aperture of the design element of each individual stencil. A side view of a decorative object is shown.

D. Next, a correspondingly decorative object 30 is conformably placed in each aperture 25, with its flat base 31 downwardly and upper surface 31 extended above the board 10's flat upper surface 11. The placement of the decorative objects, conformably in corresponding apertures 25, may be accomplished by means of a brush 50, as shown in FIGS. 7 and 8. Although the direction is not critical, as demonstrated, particularly in FIG. 8, when a uniform motion of the brush is applied, a properly aligned decorative object 30 will fit, and stay conformably, in a corresponding aperture 25, but a decorative object 30, not properly aligned, will not be held in place, and will be brushed away by the sweeping motion 51.

E. Next, the retaining cover sheet 40 with its adhesive backed lower surface 42 downward is manually placed over and in contact with each of the decorative objects 30 which are situated with the define cavities 25 of the individual stencil units 21 which form the desired decorative design.

F. Next, the cover sheet 40 with decorative objects 30 adhered to the undersign 42 thereof is manually lifted away from the base board 10 leaving the stencil units 21 attached thereto.

G. Next, cover sheet 40 is placed in the desired location over the clothing or other article with the underside 31 of each decorative object 30 contacting the article.

H. Finally, a heat source, as defined above, including an iron or hear press, is applied over sheet 40 and the decorative articles 30 activating the adhesive on the base 31 of each decorative object 30 and adhering the decorative objects 30 to the separate article in the desired design.

Whereas, a primary embodiment of the invention has been illustrated and described in detail, it will be apparent that various changes may be made in the disclosed embodiment-without departing from the spirit of the invention.

What is claimed is:

1. A kit for assembling a decorative object pattern on a separate article, comprising:

a mounting board member having a substantially flat upper surface and defined perimeter, the mounting board member including a magnetic attracting layer;

a plurality of magnetically adhering stencil units each having a lower surface and a corresponding substantially parallel upper surface, the upper surface of each individual stencil unit defining one or more cavities thereon, said parallel lower and upper surfaces defining a substantially uniform stencil thickness and such that the lower surfaces of said stencil units are magnetically adhered against the flat upper surface of the mounting board member in a resistibly slidable relationship;

a supply of non-metallic decorative objects, each having a flat undersurface, an upper surface, and a defined height, each of said defined cavities in said stencil units conformed to accept therein the undersurface of a corresponding decorative object, each decorative object being of sufficient height so that it's upper surface extends to or above the upper surface of an associated one of said stencil units when the object's lower surface is accepted within a conforming cavity defined in said stencil unit; and a cover sheet having an upper surface and an adhesive backed lower surface, said cover sheet being placed over said stencil units in a first step so that said upper surfaces of said non-metallic decorative objects are adhered to said adhesive backed lower surface and so that, upon lifting said cover sheet with said decorative articles away from said stencil units, the magnetic attraction established between said stencil units and said mounting board member prevents either misalignment or lifting off of said stencil units from said mounting board member, said cover sheet adapted to being placed in a succeeding step over the separate article during which the flat undersurface of each of the decorative objects is bonded to the separate article.

2. The invention of claim 1, wherein the separate article is comprised of material selected from a group of fabric, paper, wood and metal.

3. The invention of claim 1, wherein the decorative objects are comprised of material selected from a group of rock crystal, metal, ceramic, glass or acrylic.

4. The invention of claim 1, wherein the defined cavities in the plurality of stencil units are apertures extending between upper and lower surfaces thereof.

5. The invention of claim 1, wherein the upper surface and lower surface of each individual stencil unit are of an area marginally sufficient to contain the total number of cavities on said individual stencil unit.

6. The invention of claim 1, wherein the cavities defined by each individual stencil unit comprise a portion of an overall design and the plurality of stencil units, when placed and held together on the mounting board member comprise an overall decorative pattern.

7. The invention of claim 1, further comprising a heat-activated adhesive initially affixed to the undersurface of each decorative object for bonding to the separate article.

8. The invention of claim 4, wherein each stencil unit further comprises a material selected from a group including one of a substantially rigid material, a metal, and a flexible, returnably planar material, said plurality of stencil units being provided on one or more sheets of such material with each individual stencil unit removably stamped on such sheet.

9. A kit for arranging and holding plurality of stencil patterns in a decorative design arrangement, comprising:

a mounting board member having a substantially flat upper surface and defined perimeter, said board further having a magnetic material;

a plurality of stencil units, each of which defines a design element, said stencil units being constructed of a magnetically attractable material and held against the upper surface of said mounting board member in resistibly slidable relationship by magnetic force generated by the middle layer;

a plurality of non-metallic decorative objects placeable within apertures defined in said stencil units, each decorative unit being of sufficient height so that it extends at least to an upper surface of an associated stencil unit; and a cover sheet having an upper surface and an adhesive backed lower surface, said cover sheet being placed over said stencil units so that said decorative objects are adhered to said adhesive backed lower surface, upon lifting said cover sheet with said decorative articles away from said stencil units, the magnetic attraction established between said stencil units and said mounting board member prevents either misalignment or lifting off of said stencil units from said mounting board member, said cover sheet adapted to being placed in a succeeding step over a separate article during which a flat undersurface of each of the decorative objects is bonded to the separate article.

10. The invention of claim 9, wherein the plurality of stencil units are selected from at least one sheet of stencil material having a plurality of stencil units cut out therein, each of said cut outs being held removably in place on said sheet by at least one severable tab connecting said stencil unit with the sheet.

11. The invention of claim 9, wherein the board member is further comprised of an upper smooth surface layer, a middle layer of magnetic material and a substantially rigid lower support layer.

* * * * *